(12) United States Patent
Mehrabanzad et al.

(10) Patent No.: US 10,764,933 B2
(45) Date of Patent: Sep. 1, 2020

(54) PREDICTIVE CONNECTIVITY SERVICE LAYERS

(71) Applicant: FEDERATED WIRELESS, INC., Arlington, VA (US)

(72) Inventors: Sepehr Mehrabanzad, Wellesley, MA (US); Iyad Tarazi, Great Falls, VA (US); Deepak Das, Lexington, MA (US)

(73) Assignee: Federated Wireless, Inc., Arlington, VA (US)

( * ) Notice: Subject to any disclaimer, the term of this patent is extended or adjusted under 35 U.S.C. 154(b) by 60 days.

(21) Appl. No.: 15/150,383

(22) Filed: May 9, 2016

(65) Prior Publication Data

US 2016/0330746 A1  Nov. 10, 2016

Related U.S. Application Data

(60) Provisional application No. 62/158,959, filed on May 8, 2015, provisional application No. 62/163,624, filed
(Continued)

(51) Int. Cl.
*H04W 72/04* (2009.01)
*H04L 12/24* (2006.01)
(Continued)

(52) U.S. Cl.
CPC ........ *H04W 76/10* (2018.02); *H04B 7/18523* (2013.01); *H04L 5/0048* (2013.01);
(Continued)

(58) Field of Classification Search
CPC ......... H04W 72/0486; H04W 72/0453; H04W 72/085; H04W 12/06; H04W 48/06; H04L 67/22; H04L 41/026
See application file for complete search history.

(56) References Cited

U.S. PATENT DOCUMENTS 7,672,005 B1 * 3/2010 Hobbs ................. H04N 1/41
345/543
2003/0217125 A1 * 11/2003 Brancati ............... H04L 67/22
709/220

(Continued)

*Primary Examiner* — Jamal Javaid
*Assistant Examiner* — Thad N Defauw
(74) *Attorney, Agent, or Firm* — Finnegan, Henderson, Farabow, Garrett & Dunner LLP (57) ABSTRACT

A system and method is provided for a predictive connectivity layer. In the disclosed embodiments, resources, such as bandwidth, processing, and memory, at a network node are dynamically allocated based on one or more predicted user behaviors. A predicted user behavior may be determined based on one or more previous actions of a user or a group of users at the network node. For example, if a user accesses the network node to download a particular web site at the same time every morning, the predictive technique may determine that the user will attempt to download the same web site the next morning, and therefore cache a copy of the web site before the user's next attempt to access the network through the network node. Similarly, the network node may predict an amount of bandwidth or other resources to allocate based on previous behavior of one or more users.

52 Claims, 3 Drawing Sheets

Related U.S. Application Data on May 19, 2015, provisional application No. 62/163,743, filed on May 19, 2015, provisional application No. 62/164,949, filed on May 21, 2015, provisional application No. 62/165,018, filed on May 21, 2015.

(51) Int. Cl.

| | | |
|---|---|---|
| *H04W 12/06* | (2009.01) | |
| *H04W 48/06* | (2009.01) | |
| *H04W 72/08* | (2009.01) | |
| *H04L 29/08* | (2006.01) | |
| *H04W 76/10* | (2018.01) | |
| *H04W 76/27* | (2018.01) | |
| *H04W 12/08* | (2009.01) | |
| *H04W 4/60* | (2018.01) | |
| *H04L 12/14* | (2006.01) | |
| *H04W 48/16* | (2009.01) | |
| *H04L 12/66* | (2006.01) | |
| *H04L 12/931* | (2013.01) | |
| *H04M 15/00* | (2006.01) | |
| *H04W 4/24* | (2018.01) | |
| *H04B 7/185* | (2006.01) | |
| *H04L 5/00* | (2006.01) | |
| *H04W 56/00* | (2009.01) | |
| *H04L 29/12* | (2006.01) | |
| *H04W 88/08* | (2009.01) | |
| *H04W 84/20* | (2009.01) | |

(52) U.S. Cl.
CPC .............. *H04L 12/14* (2013.01); *H04L 12/66* (2013.01); *H04L 41/026* (2013.01); *H04L 41/12* (2013.01); *H04L 41/5051* (2013.01); *H04L 49/70* (2013.01); *H04L 67/02* (2013.01); *H04L 67/10* (2013.01); *H04L 67/142* (2013.01); *H04L 67/22* (2013.01); *H04M 15/55* (2013.01); *H04M 15/66* (2013.01); *H04W 4/24* (2013.01); *H04W 4/60* (2018.02); *H04W 12/06* (2013.01); *H04W 12/08* (2013.01); *H04W 48/06* (2013.01); *H04W 48/16* (2013.01); *H04W 56/0015* (2013.01); *H04W 72/0453* (2013.01); *H04W 72/0486* (2013.01); *H04W 72/085* (2013.01); *H04W 76/27* (2018.02); *H04L 41/5087* (2013.01); *H04L 41/5096* (2013.01); *H04L 61/1505* (2013.01); *H04W 84/20* (2013.01); *H04W 88/08* (2013.01)

(56) References Cited

U.S. PATENT DOCUMENTS

| | | | |
|---|---|---|---|
| 2004/0221185 A1* | 11/2004 | Bose | G06F 1/3203 713/300 |
| 2007/0282855 A1* | 12/2007 | Chen | H04L 63/10 |
| 2009/0293122 A1* | 11/2009 | Abdel-Aziz | H04L 63/1416 726/23 |
| 2013/0159274 A1* | 6/2013 | Silberstein | H04L 67/20 707/706 |
| 2013/0159408 A1* | 6/2013 | Winn | G06N 20/00 709/204 |
| 2013/0309965 A1* | 11/2013 | Hillan | H04M 1/7253 455/41.1 |
| 2014/0018033 A1* | 1/2014 | Luna | H04W 28/0215 455/405 |
| 2014/0195853 A1* | 7/2014 | Singh | G06F 11/2294 714/33 |
| 2014/0237079 A1* | 8/2014 | Lockerbie | H04N 21/2146 709/218 |
| 2014/0269364 A1* | 9/2014 | Knapp | H04L 41/0823 370/252 |
| 2014/0273950 A1* | 9/2014 | Li | G06F 3/0481 455/410 |
| 2015/0324559 A1* | 11/2015 | Boss | H04L 63/20 726/1 |

* cited by examiner

PREDICTIVE CONNECTIVITY SERVICE LAYERS

CROSS-REFERENCE TO RELATED APPLICATIONS

This application claims the benefit of each of U.S. Provisional Application Ser. No. 62/158,959, filed May 8, 2015, U.S. Provisional Application Ser. No. 62/163,624, filed May 19, 2015, U.S. Provisional Application Ser. No. 62/163,743, filed May 19, 2015, U.S. Provisional Application Ser. No. 62/164,949, filed May 21, 2015, and U.S. Provisional Application Ser. No. 62/165,018, filed May 21, 2015, each of which is hereby incorporated by reference in its entirety.

TECHNICAL FIELD

The present disclosure generally relates to systems and methods for predictive learning in a network, and more specifically, to systems and methods for predicting and altering network service connectivity at a network node.

BACKGROUND

A network includes a set of interconnected network nodes configured to communicate with one another, for example, over one or more wired or wireless communications links. A network node may be any device configured to communicate over the network, including for example any type of user equipment (such as mobile devices, computers, smartphones, tablets, laptops, etc.), access points, servers, routers, switches, gateways, or other computing devices connected to the network.

In a conventional network, services that may be provided by a network node are limited based on finite resources, such as processing, storage, and bandwidth, and existing hardware at the node. In practice, the network node typically uses predefined configurations, algorithms, and parameters to allocate its limited available resources to users who access the network through the network node. For example, a network node may be pre-configured to support only a predetermined number of user connections or user requests at a given time based on its finite available bandwidth or processing resources.

The conventional technique of using static and predetermined network configurations for a network comprising multiple network nodes suffers certain shortcomings. For example, static network configurations are typically determined based on the expected usage of the network, and the expected usage may be vastly different from the actual usage. This difference may cause network resources to be under provisioned or over provisioned. Some conventional techniques may alter network configurations based on a reported, past usage. However, the reported usage may not accurately reflect the future usage. Furthermore, most conventional techniques determine the network configuration based on aggregate usage metrics and do not track or reflect individual user behavior. Therefore, a conventional network typically cannot provision user-specific resources.

Additionally, conventional techniques typically determine network configuration based on measurements from groups of network nodes instead of an individual single node, where the grouping of the network nodes are based on their geographical location (e.g., nodes that are located in the same building) or common networking domain. Such network configurations may not reflect the dynamic activity levels on individual network nodes.

SUMMARY

The present disclosure overcomes the disadvantages of the prior art by providing a system and method for a predictive connectivity layer. In the disclosed embodiments, resources, such as bandwidth, processing, and memory, at a network node are dynamically allocated based on one or more predicted user behaviors. A predicted user behavior may be determined based on one or more previous actions of a user or a group of users at the network node. For example, if a user accesses the network node to download a particular web site at the same time every morning, the predictive technique may determine that the user will attempt to download the same web site the next morning, and therefore cache a copy of the web site before the user's next attempt to access the network through the network node. Similarly, the network node may predict an amount of bandwidth or other resources to allocate based on previous behavior of one or more users.

Advantageously, the disclosed embodiments are not constrained by static, predefined hardware or resource configurations or settings at a network node like conventional implementations. Instead, the disclosed embodiments employ predictive learning algorithms that enable sophisticated data analytics, for example in a scalable cloud-based system, which may be used to dynamically alter network performance based on predicted user behaviors not tied to a network node's limited hardware and resources. Unlike prior techniques, a cloud-based network in some disclosed embodiments provides more available resources, distributed across multiple network nodes in the cloud platform, which can be dynamically allocated as needed to support changing levels of user traffic or resource demands in the network.

In some disclosed embodiments, the predictive learning technique may determine user behavior at a network node based on requests from multiple users requesting access to the network through that node. The network node may pre-populate user access information, for example stored in one or more databases, based on a determined user behavior before a user's next attempt to access the network through the network node. In accordance with the disclosed embodiments, pre-populating the node's user access information allows network configurations and settings to be altered in anticipation of one or more future user actions. The user access information may be dynamically updated, for example, by one or more cloud-based services in the network, to allocate sufficient resources at the network node based on knowledge of previous actions of one or more users at the node.

The pre-populated user access information at the network node may include, but is not limited to, authentication rules and policy information for one or more users. The authentication rules may include, for example, information relating to when users may use the network node to authenticate on the enterprise network. The policy information may include, among other things, information relating to access or security permissions and quality of service levels to provide to different users. The predictive learning technique disclosed herein may determine a user behavior and use that determined behavior to alter one or more authentication rules and/or policy information to manage resource allocation at the network node. Based on the altered information, the network node may dynamically pre-populate its configuration settings or parameters, which was not possible using conventional implementations.

The foregoing general description and the following detailed description are exemplary and explanatory only and are not restrictive of the claims.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 1:
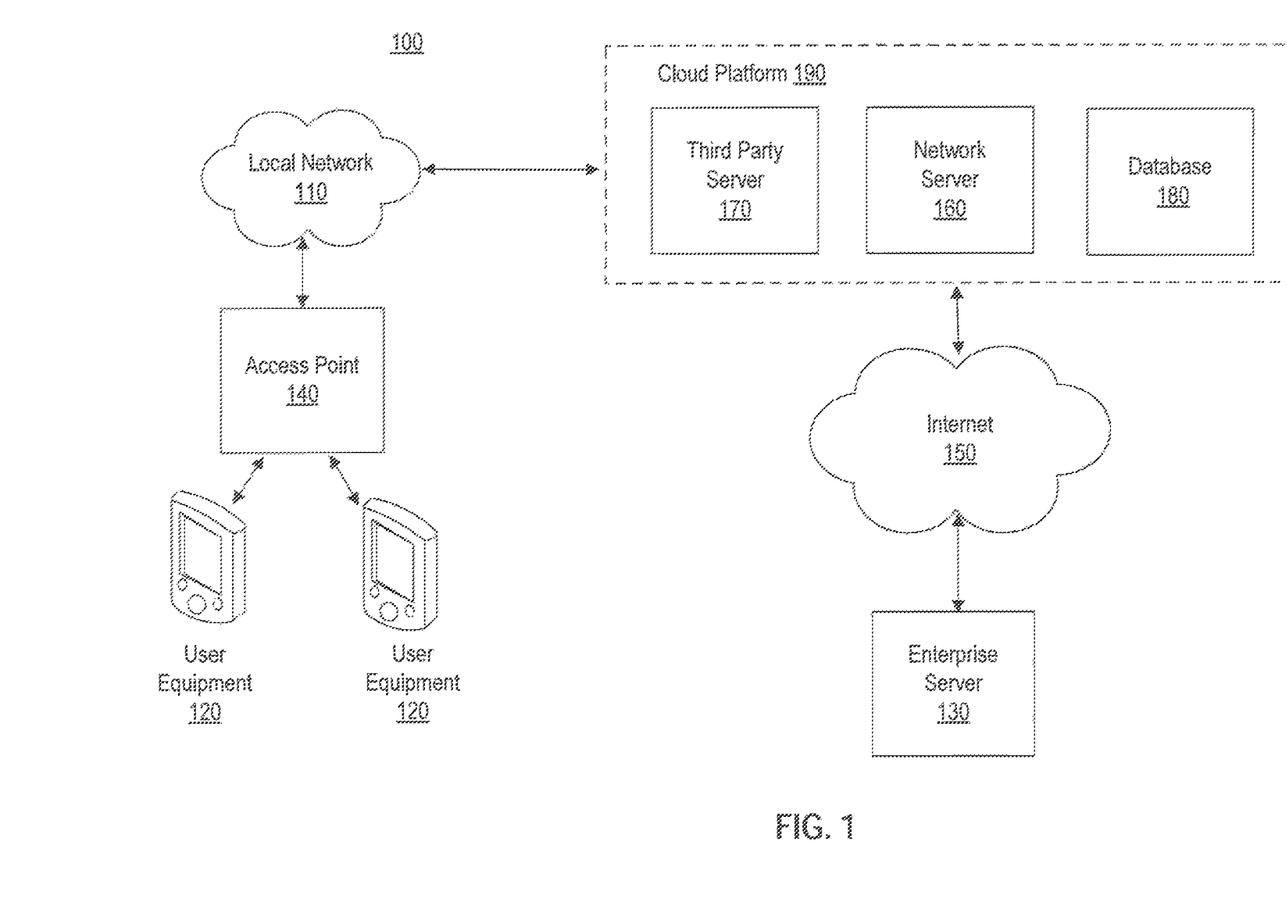
FIG. 1 is a schematic block diagram illustrating an exemplary embodiment that may be used to perform predictive learning in a cloud-based network in accordance with the disclosed embodiments.

FIG. 1 is a block diagram of an exemplary disclosed embodiment of a system 100 that may be used to perform predictive learning in a cloud-based network. Various enterprise organizations may implement system 100. To that end, an enterprise organization, such as a corporate, government, academic, or other entity, may deploy a local network 110 and one or more access points 140 and other network nodes (not shown) configured to communicate over the local network. The enterprise organization may be at least partially deployed in a public space or in a private place of business. While the exemplary disclosed embodiment is described in terms of an enterprise organization, those skilled in the art will understand that the system 100 is not limited to use by employees of a business. For example, users of the system 100 may include members of a family connecting to a cloud-based network recreationally and may include individuals located within and/or outside of the enterprise organization.

Users in the enterprise organization may operate respective user equipment 120, such as smartphones, tablets, computers, or other computing devices, to access the local network 110 through a network node, such as an access point 140, deployed in the enterprise organization. The user equipment 120 may include personal computing devices such as, for example, general purpose computers, notebook computers, mobile devices, tablets, smartphones, wearable devices, and any other computing devices that may be used to communicate with the access point 140.

Each access point 140 in the disclosed embodiment of FIG. 1 is configured to communicate with one or more user equipment 120. The access points 140 may provide, for example, authentication services that enable users to access information or services on a remote enterprise server 130, and may also provide other network and/or enterprise services to users of the user equipment 120.

In some embodiments, each access point 140 may be configured to cache a user's data and provide a cached version of the data when requested by a user equipment 120. The data to be stored in the cache may be determined based on individual and/or aggregate user behavior at one or more access points 140 using one or more predictive learning algorithms consistent with the disclosed embodiments. For example, the predictive learning algorithms may identify data that are frequently accessed/requested by an individual or a group of users and may cause the identified data to be stored in the cache. In another example, the predictive learning algorithms may identify and cause caching of the data that a user equipment 120 is expected to access in the future.

Each access point 140 may cache user's data using a user content caching (UCC) service implemented on a cloud platform 190 according to the disclosed embodiments. In some embodiments, the UCC service may include a distributed portion that executes at each access point 140 and a stateless cloud portion that executes on the cloud platform 190. The distributed portion and the cloud portion of the UCC service may communicate with each other using any cloud-based protocols, such as, but not limited to, SOAP and REST.

As an example, when a user equipment 120 sends a request for data to the access point 140, the access point 140 may use the distributed portion of the UCC service to query the cloud portion of the UCC service to determine if a cached version of the requested data is available. If the cached version of the requested data is available, the cloud portion of the UCC service may retrieve (e.g., from a database server/service) and send the data to the distributed portion of the UCC service. Subsequently, the access point 140 may forward the data to the user equipment 140.

According to the disclosed embodiments, the predictive learning algorithms described in the disclosed embodiments may be implemented in the cloud portion of the UCC service. Further, the predictive learning algorithms of the cloud portion of the UCC service may communicate with other services in the cloud platform 190 and/or other servers/services (e.g., enterprise servers) via the Internet 150. In some embodiments, the predictive learning algorithms may determine which data to cache based on the result of its communication with other services in the cloud platform 190 and/or other servers/services. In one example, the predictive learning algorithms of the UCC service may communicate with an enterprise productivity server, which may have access to a user's work calendar and/or emails. In this example, the predictive learning algorithms may cause caching of an email attachment prior to the user's arrival at the office and/or a presentation file to be used by the user in a scheduled meeting.

In some embodiments, each access point 140 may be capable of reconfiguring network configuration across the entire network or parts of the network. For example, one or more access points 140 may configure at least a portion of the network to power on or off. In another example, one or more access points 140 may be capable of altering network configuration and resources across all network layers (e.g., RF, PHY, MAC, RRC, and Networking).

In the disclosed embodiments, an access point 140, using predictive learning algorithms, may dynamically alter the network configuration of a network node or plurality of network nodes to alter the quality of service for one or more users. For example, the predictive learning algorithms may determine the time when an access point 140 is expected to experience the heaviest traffic (e.g., an access point near an entrance of a building during the morning commute time) and may cause the access point 140 to provision an increased amount of network resources during the identified time. Additionally, or alternatively, an access point 140, using predictive learning algorithms, may dynamically alter the network configuration to adjust the cost of network operation. For example, an access point 140 may turn off a portion of the network to save power consumption when the predictive learning algorithms determine that the portion of the network is expected to be unused by users.

According to the disclosed embodiments, the predictable algorithms may also be used to dynamically alter network configurations, In some embodiments, the predictable algorithms may dynamically alter network configurations based on communicating with other services of the cloud platform or other servers/services via the Internet. For example, the predictive learning algorithms may communicate with an enterprise productivity server and determine that a building-wide emergency test is scheduled on a certain day. Accordingly, the predictable learning algorithms may cause at least some portions of the network to turn off and reduce power consumption during the scheduled emergency test.

The access points 140 may be strategically and spatially positioned within an enterprise environment to alter network connectivity for the user equipment 120. For example, access points may be placed in offices, conference rooms, and hallways in office buildings, or alternatively, may be deployed in other locations, such as in a home residence. In some embodiments, the access points 140 may operate as a terminal point, or alternatively, may act as an intermediary point for connecting other network nodes in the enterprise organization. For example, the access points 140 may include routers, modems, and Wi-Fi or wireless access points (WAP) that provide access to the local network 110. The access points also may allow for connectivity to a wired network, such as an Ethernet network in the enterprise organization (not shown). The access points 140 may be positioned such that a user may relocate, for example, from a third floor to an eighth floor of a building, without losing access or experiencing disruptions to their network connectivity. The user may connect to multiple spatially positioned access points 140. At least one enterprise server 130 may monitor user usage at the access points 140 to provide enhanced mobility (e.g., smoother handoffs between access points) for users who move within the enterprise environment.

In the exemplary local network 110, network devices, such as routers, switches, and gateways, communicate with one or more servers in the cloud platform 190. The cloud platform may comprise one or more network servers 160, third party servers 170, and/or databases 180. At least some of the servers 160 and 170 provide cloud services for users in the enterprise organization. For example, the enterprise organization may implement a cloud-based service comprising a distributed portion that executes at an access point 140, and a corresponding cloud portion that executes on a network server 160 in the cloud platform 190. Although not shown in FIG. 1, one or more of the enterprise servers 130 also may provide cloud-based services in the cloud platform 190. Servers in the cloud platform 190 may communicate with an enterprise server 130 over the network 150 using appropriate cloud-based communication protocols, such as SOAP or REST and/or other protocols that would be known to those skilled in the art.

As shown in the illustrative embodiment of FIG. 1, the network 150 may be accessible to network servers 160, third party servers 170, and databases 180 in the cloud platform 190. Various networks 150 are contemplated, including but not limited to the Internet or a private data network, virtual private network using a public network, public switched telephone network, wireless cellular network, and/or any other connections that allow for sending and receiving information within system 100.

Network server 160, third party server 170, and database 180 may include networking, cloud, and/or backup services. For example, in some embodiments, network server 160 may include a cloud computing service such as Microsoft Azure™ or Amazon Web Services™. Additional cloud-based wireless access solutions compatible with LTE (e.g., using the 3.5 GHz spectrum in the US) are contemplated. In some embodiments, third party server 170 may include a messaging service, for example. The enterprise server 130 may communicate with at least some of the access points 140, user equipment 120, and one or more sensors (not shown) spatially placed within the enterprise environment to monitor, for example, temperature, humidity, heating, cooling, lighting, and other conditions in the system 100. Various types of monitoring and/or tracking sensors are contemplated. The enterprise server 130 also may authenticate users in the enterprise organization and provide information and services to authenticated users.

Further to the disclosed embodiments, an access point 140 may communicate with local network 110, network server 160, network 150, and enterprise server 130 to provide information that may be used to predict one or more future user behaviors in the enterprise organization based on previous actions of users at that access point. The predicted user behavior may be used, for example, by a cloud-based service or other software program in system 100, to pre-populate user access information associated with users of the access point 140. The pre-populated user access information may be stored, for example, in one or more databases 180 in the cloud platform 190 or in databases (not shown) at the access point 140.

Based on resource usage data provided by an access point 140, a cloud-based service in the system 100 may predicatively anticipate user demands at the access point and/or tailor individual access parameters for each user at that access point. For example, in some disclosed embodiments, a cloud portion of a service or other software program running in network server 160 and/or enterprise server 130 may enable corporate executives to access enterprise server 130 with a relatively high Quality of Service (QoS) (e.g., guaranteed bandwidth or error rate), while other employees may only access the local enterprise network with a lower QoS.

In some embodiments, system 100 may include mechanisms for an access point to collect data about individual users and compare the collected data with, and/or update, existing authentication rules and policy information. The authentication rules may include, for example, specific times of day or days in the week that a particular user may authenticate on the enterprise network. The policy information may include, for example, a required QoS based on the user's status or seniority level. In some disclosed embodiments, a cloud-based service or other software program in the system 100 may calculate a peak-to-average ratio of network traffic for one or more users at the access point 140 and may identify off-peak or idle times for multiple users or on an individual-user level based on the calculated peak-to-average ratio.

In accordance with the disclosed embodiments, predictive learning techniques may be used to predict and proactively recommend network-resource allocation at a network node based on a single user behavior or based on a behavior of a group of users, such as an access point 140. For example, machine learning techniques may monitor scheduling of downloads for one or more users to predict users' future use of the network. In this way, the results from the predictive learning may be used to alter authentication rules and/or policy information at the access point 140 in a manner that enables the access point to allocate resources more effectively, thereby improving performance at the access point and in the enterprise network more generally. The predictive learning technique of the disclosed embodiments also may lower aggregate network cost and/or pricing. Predictive learning algorithms, for example executing in a cloud-based service or other software program in system 100, may build real-time models representative of predicting both dynamic and static user usages at the access points 140.

Figure 2:
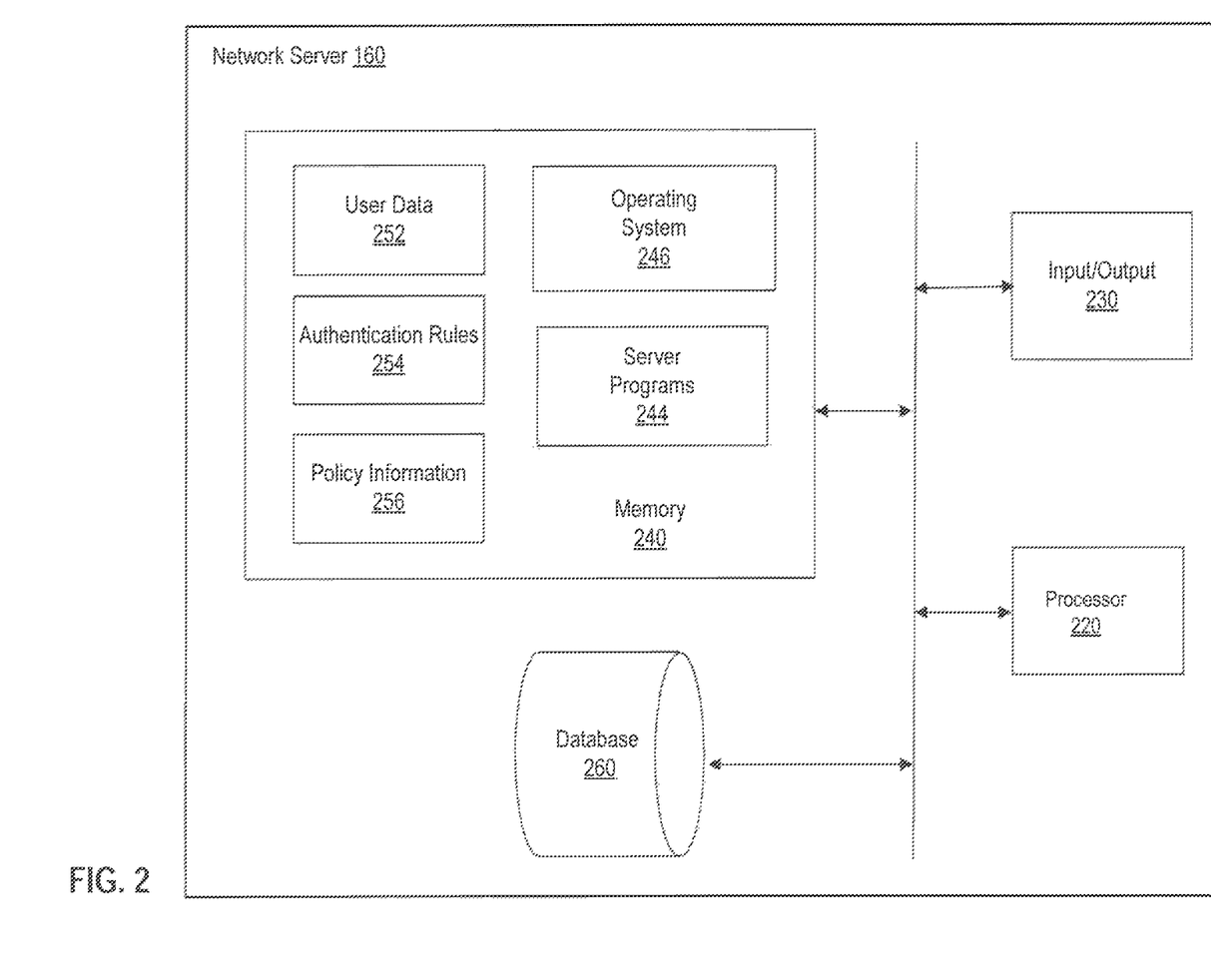
FIG. 2 is a schematic block diagram illustrating an exemplary embodiment of a network node that may be used in the exemplary system of FIG. 1.

FIG. 2 is a schematic block diagram of an exemplary embodiment of a network server 160 that may be used in the system 100. As shown in FIG. 2, network server 160 may include, among other things, a processor 220, input/output (I/O) devices 230, memory 240 for storing and/or accessing data and programs, and a database 260, each coupled to one or more interconnected internal buses. The programs stored in memory may include, for example, server programs 244 and an operating system 246. The server programs 244 may implement the predictive learning algorithm of the disclosed embodiments using a cloud-based service or, alternatively, a separate software program for execution in the network server 160. In alternative embodiments, the software program 244 may reside in one or more access points 140 which implement the predictive learning systems and methods disclosed herein.

Memory 240 and/or database 260 may store user data 252 based on individual and/or aggregate user behavior at one or more access points 140, such as data indicating network usage of users connected to one or more access points. The memory also may store other data and programs (not shown). User data 252 may include user login and/or other user credentials, authentication timestamp information, network node or access point location(s) and/or preferences, and other derivative and/or calculated data generated by algorithms in the server programs 244. The memory 240 and/or database 260 also may store authentication rules 254 and policy information 256 for one or more of the access points 140 and may further store other software programs and data that are not shown.

The memory 240 and database 260 may include Microsoft SQL databases, SharePoint databases, Oracle™ databases, Sybase™ databases, or other relational databases or Cloud databases (such as AWS DynamodB, mongoDB etc.). Memory 240 and database 260 may be implemented using any volatile or non-volatile memory including, for example, magnetic, semiconductor, tape, optical, removable, non-removable, or any other types of storage devices or computer-readable mediums.

The processor 220 may be implemented as one or more processors or processor cores. The processor 220 may execute software 244 that predicatively determines a relative proximity (including for example a distance and/or traveling time) of users moving relative to one or more access points 140, for example, based on RFID signal information and/or GPS data that the network server receives from the one or more access points via the local network 100 connected to an I/O interface 230. In one exemplary embodiment, software 244 running on the processor 220 may determine if an employee has left the office, for example, by determining that the time period the employee spends in a lobby of a building exceeds a given threshold value.

The I/O interfaces 230 may include not only network interface devices, but also user interface devices, such as one or more keyboards and mouse devices. Server programs 244 may receive data from an access point 140 at an I/O device 230, analyze and generate user-access assignments according to users' authentication rules and policy information, alter the assignments and associated authentication rules and policy information to control resource usage at the access point, and send updated user access information to the access point 140, e.g., to "pre-populate" the access point with information that it may use the next time a user attempts to login through the access point. The user access information sent to pre-populate the access point 140 may include, but is not limited to, updated policy information and/or authentication rules, user credentials, documents, emails, web pages, or any other information that may be provided to a user when they attempt to login to the enterprise network at the access point 140. The network server 160 may store a copy of the pre-populated user access information that it sends to the access point 140, for example, in the memory 240, database 260, database 280, or in any other database accessible to the server 160.

Figure 3:
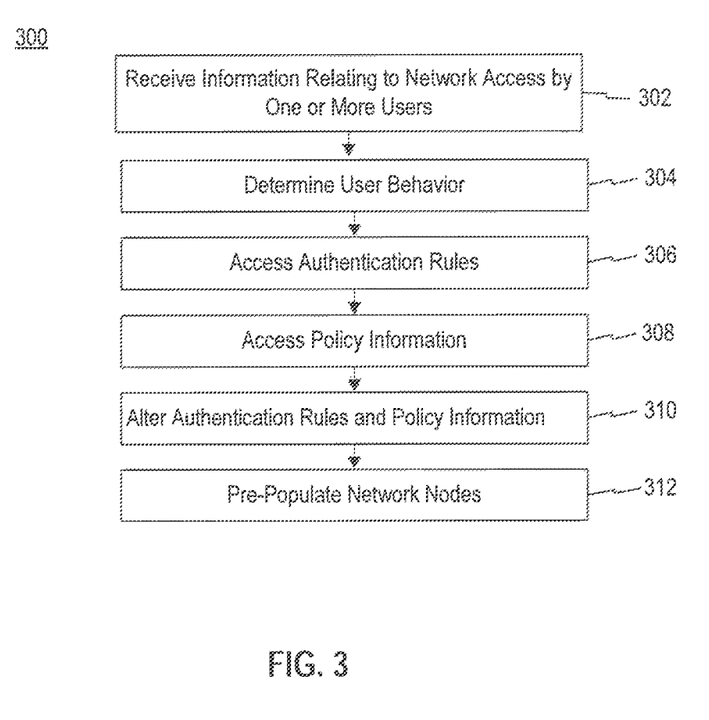
FIG. 3 is a flow chart illustrating an exemplary sequence of steps that the exemplary network node in FIG. 2 may perform in accordance with the disclosed embodiments.

FIG. 3 is a flow chart illustrating a sequence of steps 300 that may be performed in accordance with an exemplary disclosed embodiment. The process 300 may be performed, for example, by a server program executing on a network server 160 in a cloud platform, or by a cloud portion of a service running on the network server. Alternatively, the process may be performed by other network nodes, such as in an enterprise server 130, third party server 170, or access point 140. While this exemplary process is described herein as a series of steps, it is to be understood that the order of the steps may vary in other implementations. In particular, non-dependent steps may be performed in any order, or in parallel.

The process 300 starts at step 302 where the server program 244 receives information relating to one or more users that access the enterprise network at one or more access points 140. The users may access the access points using their user equipment 120 inside or outside an enterprise environment. At step 304, the system 100 determines a user behavior, for example, using software programs 244 executing in one or more of the network server 160, enterprise server 130, third party server 170, and/or access point 140. The system 100 may determine a user behavior by determining temporal, geographic, and/or other user-based habits when a user is authenticating or using the system 100. As discussed below, various embodiments of individual-user and group-user behaviors are contemplated for determining a user behavior at step 304. A few examples are provided below.

For example, a particular user may arrive at her work office at 6:00 am in the morning, and then uses her user equipment 120 to communicate with an access point 140 in her office, and sends a request to the enterprise server 130 to authenticate on the enterprise network. This pattern of behavior may occur over a series of days or weeks. Accordingly, predictive learning algorithms executing in the software programs 244 in the network server 160 may identify this user activity (both temporally and geographically) as constituting a particular user behavior based on meeting minimum, predictive learning and pattern thresholds and time periods. Various thresholds and time periods may be used to monitor and/or identify different types of user behaviors at one or more access points 140.

In another example, an employee may connect to a particular access point 140 every day at 9:00 am and download emails and/or certain types of reports. Accordingly, the system 100 may predicatively authenticate the user at the access point in advance of his anticipated arrival at 9:00 am, and pre-populate the particular access node 140 with relevant emails and/or reports that the user will want to download when they arrive.

In another exemplary embodiment, a user may send credentials for a handset (or other user equipment 120) through an access point 140 to authenticate the user at 6:00 am for access to the enterprise network. In this embodiment, the act of authenticating the user at the enterprise server may serve as the employee's time card (e.g. "punching in"). Similarly, at 6:00 pm, upon leaving the office, the same user may be required to re-authenticate, which again serves as the employee's time card (e.g. "punching out"). The predictive learning technique described herein may determine the user's expected times for punching-in and punching-out, and may pre-populate the user's access information (e.g., user login credentials) at the access point 140 to facilitate sending the user's login credentials from the access point 140 to the enterprise server 130 at the appropriate times.

In another illustrative embodiment, consider a commercial enterprise environment 100 that uses access points 140 at the loading docks of its stores. Based on monitoring user behavior at the access points, the system 100 in this example may include user data 250 indicative of the delivery times for a particular shipment of food that is routinely scheduled for 7:30 am. The user data 252 may indicate that the actual delivery times for this type of food shipment at a particular loading dock is routinely 30 minutes late, typically arriving at 8:00 am. Accordingly, the system 100 and network server 160 may predicatively determine based on algorithms in one or more server programs 244, that the delivery time needs to be changed from 7:30 am to 8:00 am. This may allow for accepting other food shipment deliveries at 7:30 am, altering not only resource management in the enterprise network, but also business operations.

In another example, the enterprise server 130 may communicate with user equipments 120 and a plurality of sensors (not shown) spatially positioned within an enterprise system 100 to monitor, for example, usage of temperature, humidity, heating, cooling, lighting, and/or other environmental conditions. Based on individual user behavior such as, for example, turning off air-conditioning upon leaving the premises, and turning on the air-conditioner upon arriving, the system 100 can dynamically build and update authentication rules and policy information based on predictions when users will arrive and leave the office in view of previous user behavior. The examples above are merely illustrative and many other uses of the invention are possible.

At step 306, the software program 244 accesses authentication rules for one or more users in the enterprise network. The authentication rules may have been established based on prior user behavior and/or default settings. The authentication rules may include rules that are pre-populated or dynamically generated at a network server 160, enterprise server 130, and/or other relevant network nodes, such as access points 140, based on prior user behavior. For example, the authentication rules may reflect which users are regularly serviced by a particular access point 140 on different days of the week or at different times of the day.

Various authentication rules are contemplated at step 306. For example, in an example above where an employee arrives at work at 6:00 am every day, system 100 may establish an authentication rule to authenticate the employee in advance of her arrival. The authentication rule may authenticate the employee at 3:00 am every day when there exists significantly less network traffic (e.g., measured relative to a peak-to-average traffic ratio), enabling the user to be pre-authenticated prior to her arrival at work. This exemplary authentication rule may reduce the amount of network traffic at 6:00 am when several employees may concurrently arrive at the office and request network access, thereby improving overall network performance and lowering the overall peak-to-average ratio of the network at 6:00 am. This exemplary authentication rule is also beneficial when the user arrives early and requests authentication a few minutes before 6:00 am, since the user will already have network access upon her arrival at the workplace.

At step 308, the software program 244 accesses policy information for the one or more users in the enterprise network. The policy information may have been established based on prior individual user behavior and/or default settings. The policy information may include information pre-populated or dynamically generated at a network server 160, enterprise server 130, and/or other relevant network nodes, such as access points 140, based on prior user behavior. The policy information may indicate, among other things, if a user is permitted to access a particular access point 140 and the user's permitted QoS level. For example, a corporate executive may require, as a policy matter, a higher QoS level than an entry-level or mid-level employee. If, however, the executive stops coming into the office and/or is no longer determined to be an executive, the software program 244 may learn over a period of time that it does not need to pre-populate access points with parameters pertaining to the executive employee's QoS. Similarly, as a policy matter, an employee on probation may only have access to the intranet or particular websites at a web-browser level, or may only have access to particular network nodes at a relatively low QoS. Various policy information that may be accessed are contemplated in step 308.

At step 310, the process 300 may alter the authentication rules and/or policy information based on the determined user behavior. If the determined user behavior deviates from existing authentication rules and/or policy information, the software program 244 may alter the authentication rules and policy information to reflect the change in user behavior. For example, QoS parameters, capacity parameters, spectrum resources, radio-frequency (RF) parameters, mobility (e.g., handoff) parameters, and other user-access information may be altered at one or more access points 140 based on the determined user behavior at step 304. This altering of the authentication rules and policy information may also include scheduling to switch on or off one or more access points 140 based on the determined user behavior. This may save energy, for example, when turning off and on air-conditioning or heating systems according to altered authentication rules. This altering of the authentication rules and policy information may further restrict or prohibit network access for one or more users at the access points 140 based on determined user behavior indicating that a user's predicted activity is risky or inappropriate for network use.

In another exemplary embodiment, resources for an access point 140 in a cafeteria may be scaled up at lunch time according to updated authentication rules and policy information. Furthermore, sharing of spectrum resources, or an allocated amount of bandwidth at one or more access points 140 may be dynamically adjusted based on predictive learning. In a cloud-based system, the software 244 may dynamically load balance bandwidth allocations among several access points 140 based on, for example, determined user behaviors, and also may allocate other resources (such as, for example, distributed processing or memory resources) among the access points.

At step 312, the process 300 pre-populates user access information for one or more access points 140 based on the altering of the authentication rules and/or policy information at step 310. Pre-populated user-access information enables a user to access his or her information as needed at one or more access points 140. For example, where an employee regularly paces up and down a hallway and travels past a sequence of access points 140 during a routine audio or video conference, software running on a network server 160 may implement predictive learning algorithms to pre-populate the access points 140 to accommodate the employee's conference call and maintain network connectivity. Predictive learning algorithms not only reduce traffic and improve overall network performance, but also cater to the vicissitudes of an individual user's network usage. Various predictive and proactive cloud-based network learning algorithms responsive to past and/or anticipated individual user behaviors are contemplated consistent with the disclosed embodiments described herein.

While the invention has been shown and described with reference to particular embodiments thereof, it will be understood that the invention can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, peer-to-peer overlaying and associated embodiments are contemplated. And while the disclosed embodiments are generally described using one or more access points 140 in the system 100, those skilled in the art will understand the invention also may be deployed in systems using other types of network nodes 140 through which users access a network. Additionally, although aspects of the disclosed embodiments are described as being stored in memory, one skilled in the art will appreciate that these aspects can also be stored on other types of computer readable media, such as secondary storage devices, including for example hard disks or CD ROMs, or other forms of RAM or ROM, USB media. DVD, Blu-ray, or optical storage media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for predictive learning in a network node of a cloud platform, the method comprising:
   receiving information relating to one or more previous actions of a user when the user is accessing the cloud platform through the network node;
   predicting a user behavior based on the one or more previous actions of the user when the user is accessing the cloud platform through the network node; and
   pre-populating user access information in the network node based on the predicted user behavior, wherein the predicted user behavior is used to allocate resources across multiple network servers in the cloud platform.

2. The method of claim 1, wherein the user access information includes at least one of an updated authentication rule or an updated policy information.

3. The method of claim 1, further comprising altering at least one QoS parameter at one or more network nodes based on the predicted user behavior and including the at least one altered QoS parameter in the user access information.

4. The method of claim 1, further comprising altering at least one user-capacity parameter at one or more network nodes based on the predicted user behavior and including the at least one altered capacity parameter in the user access information.

5. The method of claim 1, further comprising altering at least one bandwidth allocation at one or more network nodes based on the predicted user behavior and including the at least one altered bandwidth in the user access information.

6. The method of claim 1, further comprising altering at least one RF parameter at one or more network nodes based on the predicted user behavior and including the at least one altered RF parameter in the user access information.

7. The method of claim 1, further comprising altering at least one mobility parameter at one or more network nodes based on the predicted user behavior and including the at least one altered mobility parameter in the user access information.

8. The method of claim 1, further comprising switching on or off one or more network nodes based on the predicted user behavior.

9. The method of claim 1, further comprising restricting network access for one or more users at one or more network nodes based on the predicted user behavior.

10. The method of claim 1, wherein a configuration of the cloud platform is altered based on data included in the user access information.

11. The method of claim 1, wherein a configuration of the cloud platform is altered based on allocating network resources associated with the predicted user behavior.

12. The method of claim 1, wherein the predicted user behavior is used to alter a configuration of the cloud platform at more than one network node in the cloud platform.

13. The method of claim 1, wherein the user access information corresponds to one or more network resources to allocate in the network node based on the predicted user behavior.

14. The method of claim 1, wherein the user access information includes at least one of a user credential, a document, an email, and a web page.

15. The method of claim 1, wherein the user behavior is predicted using a service executing on the cloud platform.

16. The method of claim 1, further comprising caching the predicted user behavior such that the cached predicted user behavior is accessible to the network node of the cloud platform.

17. The method of claim 2, wherein the updated policy information includes a Quality of Service (QoS) level for one or more users.

18. The method of claim 2, wherein the updated authentication rule includes one or more users permitted to access the network node.

19. The method of claim 2, wherein the at least one authentication rule or policy information comprises at least one of temporal, geographic, network traffic-based, or individual user-based parameters.

20. A network node for predictive learning in a cloud platform, the network node comprising:
a processor;
a memory configured to store computer-readable instructions for execution by the processor, the instructions for performing the steps of:
receiving information relating to one or more previous actions of a user when the user is accessing the cloud platform through the network node;
predicting a user behavior based on the one or more previous actions of a user when the user is accessing the cloud platform through the network node; and
pre-populating user access information in the network node based on the predicted user behavior, wherein the predicted user behavior is used to allocate resources across multiple network servers in the cloud platform.

21. The network node of claim 20, wherein the user access information includes at least one of an updated authentication rule or an updated policy information.

22. The network node of claim 20, wherein the memory further comprises instructions executable by the processor for altering at least one QoS parameter at one or more network nodes based on the predicted user behavior and including the at least one altered QoS parameter in the user access information.

23. The network node of claim 20, wherein the memory further comprises instructions executable by the processor for altering at least one user-capacity parameter at one or more network nodes based on the predicted user behavior and including the at least one altered capacity parameter in the user access information.

24. The network node of claim 20, wherein the memory further comprises instructions executable by the processor for altering at least one bandwidth allocation at one or more network nodes based on the predicted user behavior and including the at least one altered bandwidth in the user access information.

25. The network node of claim 20, wherein the memory further comprises instructions executable by the processor for altering at least one RF parameter at one or more network nodes based on the predicted user behavior and including the at least one altered RF parameter in the user access information.

26. The network node of claim 20, wherein the memory further comprises instructions executable by the processor for altering at least one mobility parameter at one or more network nodes based on the predicted user behavior and including the at least one altered mobility parameter in the user access information.

27. The network node of claim 20, wherein the memory further comprises instructions executable by the processor for switching on or off one or more network nodes based on the predicted user behavior.

28. The network node of claim 20, wherein the memory further comprises instructions executable by the processor for restricting network access for one or more users at one or more network nodes based on the predicted user behavior.

29. The network node of claim 20, wherein the predicted user behavior is used to alter a configuration of the cloud platform at more than one network node in the cloud platform.

30. The network node of claim 20, wherein the user access information corresponds to one or more network resources to allocate based on the predicted user behavior.

31. The network node of claim 20, wherein the user access information includes at least one of a user credential, a document, an email, and a web page.

32. The network node of claim 20, wherein the memory further comprises instructions executable by the processor for caching the predicted user behavior such that the cached predicted user behavior is accessible to the network node of the cloud platform.

33. The network node of claim 21, wherein the updated policy information includes a Quality of Service (QoS) level for one or more users.

34. The network node of claim 21, wherein the updated authentication rule includes one or more users permitted to access the network node.

35. The network node of claim 21, wherein the at least one authentication rule or policy information comprises at least one of temporal, geographic, network traffic-based, or individual user-based parameters.

36. A non-transitory computer-readable medium comprising computer-readable instructions for execution by a processor in a network node that performs a method for predictive learning in a cloud platform, the method comprising:
receiving information relating to one or more previous actions of a user when the user is accessing the cloud platform through the network node;
predicting a user behavior based on the one or more previous actions of a user when the user is accessing the cloud platform through the network node; and
pre-populating user access information in the network node based on the predicted user behavior, wherein the predicted user behavior is used to allocate resources across multiple network servers in the cloud platform.

37. The non-transitory computer-readable medium of claim 36, further comprising computer-readable instructions, which when executed by the processor, cause the processor to cache the predicted user behavior such that the cached predicted user behavior is accessible to the network node in the cloud platform.

38. A method for predictive learning in a cloud platform, the method comprising:
receiving information from one or more network nodes of the cloud platform, the information relating to a user of the cloud platform, wherein the user accesses the cloud platform via one or more access points using one or more user equipment;
predicting data to be requested by the user in the future based on the received information; and caching the predicted data such that the cached data is accessible to one or more access points used by the user, wherein the predicted data is used to allocate resources across multiple network servers in the cloud platform.

39. The method of claim 38, wherein the one or more network nodes include an enterprise productivity server.

40. The method of claim 38, wherein the caching of the identified data includes storing the identified data using a service executing on a cloud platform.

41. The method of claim 38, wherein the caching of the identified data includes storing the identified data on the one or more access points used by the user.

42. The method of claim 38, wherein the predicted data is used to alter a configuration of the cloud platform at more than one network node in the cloud platform.

43. The method of claim 39, wherein the enterprise productivity server provides data for at least one of an email and a calendar of the user.

44. A method for predictive learning in a cloud platform, the method comprising:
   receiving information from one or more network nodes of the cloud platform, the information relating to at least one user of the cloud platform, wherein the at least one user accesses the cloud platform via one or more access points using one or more user equipments;
   predicting aggregate behavior of the at least one user based on the information; and
   allocating resources across multiple network servers in the cloud platform based on the predicted aggregate behavior.

45. The method of claim 44, further comprising changing QoS-related parameters on at least one network node of the cloud platform.

46. The method of claim 44, further comprising powering off at least one network node of the cloud platform.

47. The method of claim 44, further comprising configuring more than one network node in the cloud platform based on the predicted aggregate behavior.

48. The method of claim 44, further comprising caching the predicted aggregate behavior of the at least one user such that the cached predicted aggregate behavior is accessible to the one or more network nodes of the cloud platform.

49. A method for predictive learning at an access point in a cloud platform, the method comprising:
   providing information relating to one or more previous actions of a user when the user is accessing the cloud platform through the access point, wherein the one or more previous actions of the user is used to predict a user behavior;
   receiving at least one user access information based on the predicted user behavior, wherein the user access information is stored in the access point; and
   allocating resources across multiple network servers in the cloud platform based on the predicted user behavior.

50. The method of claim 49, wherein a configuration of the cloud platform is altered based on data included in the user access information.

51. The method of claim 49, wherein a configuration of the cloud platform is altered based on allocating network resources associated with the predicted user behavior.

52. The method of claim 49, further comprising caching the predicted user behavior such that the cached predicted user behavior is accessible to the access point.

* * * * *